Jan. 31, 1967   J. R. JUDGE   3,300,862

RANGE FINDER

Filed Feb. 17, 1964

INVENTOR.
JOSEPH R. JUDGE

BY

Townsend & Townsend
ATTORNEY

United States Patent Office 3,300,862
Patented Jan. 31, 1967

3,300,862
RANGE FINDER
Joseph R. Judge, 1399 Woodland Ave.,
Menlo Park, Calif. 94025
Filed Feb. 17, 1964, Ser. No. 345,281
1 Claim. (Cl. 33—72)

This invention relates to a device for measuring the range of a target and is particularly adaptable for application in the game of golf.

In golf it is often desirable to estimate the range of the hole by some means other than by judgment. In such devices the range to be estimated is generally in the order of 50 to 300 yards, so that the conventional pocket range finders are not sufficiently accurate or are too costly to justify their use in this sport.

The principal object of the present invention is to provide a novel device which registers the calculation of distance of an object by triangulation and comprises a card having alignment sights which will align the card with respect to a target from a first position or bench mark, and a second sighting marker on the card which will allow the card to be aligned relative to the bench mark when the device is moved to a second position a predetermined position and direction from the bench mark and with further provision of a sighting scale which can be aligned with the target which will give a direct readout of the distance of the target from the bench mark.

One of the features and advantages of this device lies in the fact that the entire range finding apparatus can be mounted on a small card, support or panel, which can be adapted to receive a golf score card.

A still further object of the present invention is to provide a range finder which is adapted to fit on the top of a typical golf cart so that the golf cart handle provides the support for the range finder during the sighting operation. Thus, the accuracy of a stable platform is obtainable in conjunction with the use of a golf cart.

Another object of this invention is to provide a simple apparatus for estimating ranges with a direct range readout scale in which the device provides means for alignment of the device by sighting a line between the target and the bench mark and means to establish a base line and for aligning the device with the base line after the device has been moved a predetermined distance along the base line from the bench mark. With the card in alignment at the second position, the scale is arranged to read the distance to the sighted object when a slider forming a part of a scale is aligned with the target.

These and other objects, features, and advantages will be more apparent after referring to the following specification and accompanying drawing in which.

Figures 1, 2:
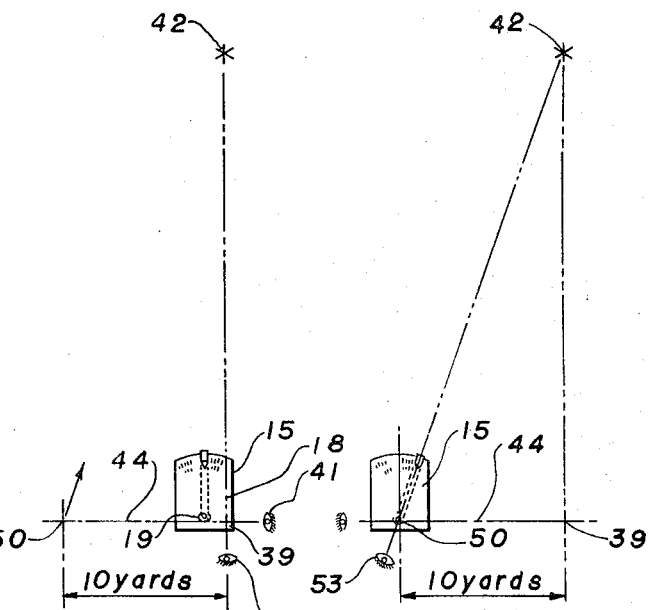
FIG. 1 is a diagrammatic view showing the first step of operation of the subject invention.
FIG. 2 is a schematic view showing the second step in the operation.
Figure 6:
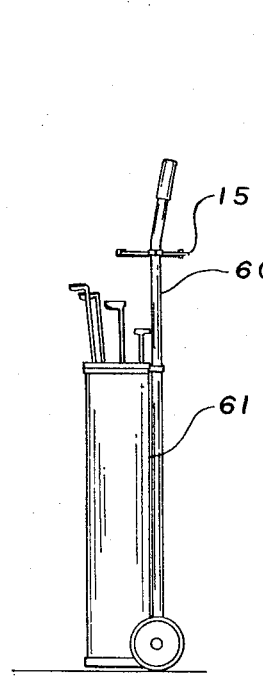
FIG. 6 is a side-elevational view of a typical golf cart having the range finder of the present invention attached thereto.
Figure 5:
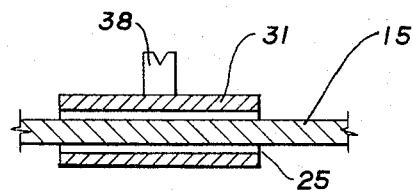
FIG. 5 is a cross-sectional view of FIG. 4 taken at line 5—5 of FIG. 4.
Figure 4:
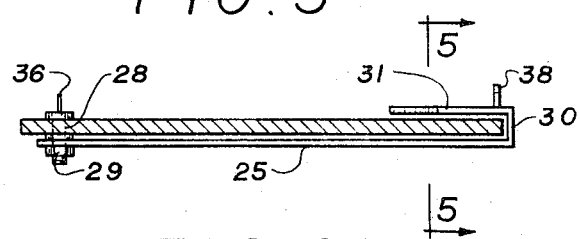
FIG. 4 is a cross-sectional view taken at line 4—4 of FIG. 3.
Figure 3:
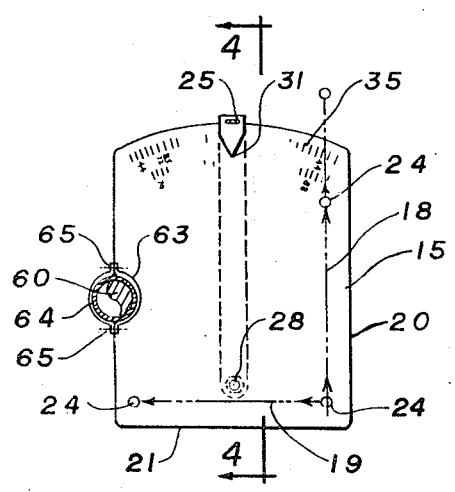
FIG. 3 is a top plan view of the invention.

Referring now to the drawings, there is provided within the range finder of the present invention a board or base plate 15. The base plate 15 is provided with a target sighting line 18 and a base sighting line 19. The two lines 18 and 19 are disposed at right angles to each other and preferably parallel the two edges 20 and 21 of plate 15. Raised embodiments or projections 24 may be used to provide a raised sight for parallel sighting, if desired. A slider arm 25 is pivotally mounted to the base plate 15 at 28. Slider 25 is mounted on the rear face of the frame by a nut and bolt combination 29. It thence extends through the length of the plate and thence upward at 30 and thence downward to form a depending pointer 31. The face of the plate is provided with indicia at 35 which is in the expression of distance. The top of nut and bolt combination 29 is provided with a sighting pin 36, and the middle top of section 31 of the slider 25 is provided with an upwardly extending forward sight 38. The card or plate 15 can be made of a suitable material, such as wood, plastic, metal or the like.

In operation, the card or plate 15 is positioned with the intersection of sighting lines 18 and 19 at point 39, as seen in FIG. 1, over a golf ball. A sighting from a position at 40 is then made along line 18 to the hole 42 or other appropriate target. With the plate 15 still in the aforesaid aligned position a second sight is taken from position 41 along base line marker 19 to establish a base line 44. In the next step of operation, as seen in FIG. 2, a predetermined distance of for example 10 yards is measured off along base line 44 from bench mark or base point 39. Plate 15 is then positioned over point 50 which is at the 10 yard position on base line 44, and base line marker 19 is aligned with the base line while at the same time pivot point 28 for slider 25 is positioned immediately over point 50. The eye is then positioned as at 53 to form a sight through sighting pin 36 and forward sight 38 to the hole or target 42. Under these conditions pointer 31 will be at a position which is marked off with a distance indicia calculated to give the distance between point 39 and 42.

In practical operation, the 10 yards can be paced off once the operator can gage the length of his paces. While 10 yards have been specified it is to be noted that the 10 yards as specified in the principal embodiment are used only because of their convenience and practical dimension, it being understood that any practical distance along the base line 44 can be used if the scale 35 is changed accordingly. It is noted that scale 35 can be calibrated mathematically by common techniques employed in establishing distances by triangulation.

It is to be noted that it is important that alignment of the sighting lever and of the plate remain constant. In order to effect this relationship the range finder is adapted for mounting on the handle 60 of a golf cart 61 of conventional design. Plate 15 is provided with a cylindrical cut-out portion 63 with an overlaying flange 64 held onto the plate by flange fittings 65. By this mechanism the plate is mounted on handle 60. It can be seen that with the device so mounted on the golf cart it is possible to rigidly position the device for sighting. Thence, the appropriate distance along base line 44 can be measured off with the range finding device still in place over point or bench mark 39. After establishing the second sighting point 50 the card can be moved to the point 50, and line 19 can be aligned with the base line 44 by sighting line 19 to the golf ball or bench mark 39. Because plate 15 is mounted on the shaft 60 of cart 61 it will remain in place while pointer 25 is moved to a position for sighting to point 42. By this means accurate and true measurements of distance are readily obtainable. It is also believed apparent that the card or platform 15 can be used as a support for a golf score card, cigarets, or for other articles such as tees, if desired.

While the principal embodiment of this invention has been described principally in relationship with a golf course, it is to be understood that the device can have other application in other fields, such as, for example, in navigation or photography where the estimate of distance is of importance.

What is claimed is:

A device for determining the range of a target, comprising a base board, said base board having sighting means defining a first and second sighting line, said second sighting line being disposed normal to said first sighting line, a scale on said board, a slider mounted on said board for movement along said scale, a front sight on said slider, a rear sight fixedly mounted on said board and spaced from the locus of said front sight, said front and rear sight defining a third sighting line, a pointer on said slider movable therewith to align with said scale, said scale marked off in indicia representing distance as a function of the angle between said first and third sighting lines, the position for zero distance alignment of said pointer being at the position where said third sighting line is parallel to said second sighting line, a vertical standard, a pair of wheels supporting said standard in an upright position and arranged to allow said standard to be moved along an axis between selected locations, means mounting said baseboard on an upper portion of said standard whereby said baseboard can be moved with said standard between first and second positions, said first sighting line being aligned to sight along the axis of movement of said standard.

References Cited by the Examiner

UNITED STATES PATENTS

| | | | |
|---|---|---|---|
| 219,146 | 9/1879 | Burton | 33—66 |
| 576,900 | 2/1897 | Scott | 33—66 |
| 737,956 | 9/1903 | Nicholson | 33—67 |
| 2,772,480 | 12/1956 | Vrana | 33—67 |

LEONARD FORMAN, *Primary Examiner.*

SAMUEL S. MATTHEWS, *Examiner.*